United States Patent [19]

Henry et al.

[11] 4,313,046

[45] Jan. 26, 1982

[54] WATER COOLED WELDING GUN

[75] Inventors: Larry O. Henry, Troy; Cecil V. Livesay, Greenville, both of Ohio

[73] Assignee: Hobart Brothers Company, Troy, Ohio

[21] Appl. No.: 128,701

[22] Filed: Mar. 10, 1980

[51] Int. Cl.³ .............................................. B23K 9/00
[52] U.S. Cl. ............................. 219/137.62; 29/592 R; 156/294
[58] Field of Search ............. 219/137.62; 174/16 HS; 29/592 R; 156/293, 294, 330

[56] References Cited

U.S. PATENT DOCUMENTS

| | | | |
|---|---|---|---|
| 2,870,295 | 1/1959 | Haroldson | 156/330 X |
| 3,121,154 | 2/1964 | Menzies . | |
| 3,396,361 | 8/1968 | Sussman | 174/16 HS |
| 3,524,040 | 8/1970 | Gabe . | |
| 3,585,272 | 6/1971 | Shatz | 174/16 HS |

FOREIGN PATENT DOCUMENTS 659585 3/1963 Canada ........................... 174/16 HS

*Primary Examiner*—Elliot A. Goldberg
*Attorney, Agent, or Firm*—Biebel, French & Nauman

[57] ABSTRACT

A water cooled welding gun (10) includes an elongated current carrying inner tube (40) having a central opening (42) through which a consumable electrode and shielding gas may pass. The inner tube is provided with cooling passageways (50). A gas shielding nozzle (35) is connected to a gun tube cover (55) and is in thermal contact with the inner tube (40) through two layers of thermally conductive but electrically insulative materials (100, 105). The first layer (100) is preferably a rigid ceramic material, such as $Al_2O_3$, and the second layer (105) is preferably a thermally conducting but electrically insulating material, such as epoxy, which is pliable when initially applied. The second material (105) fills the gaps between the outer surface of the first material and the inside surface of the gun tube cover (55) to provide a direct thermal path for the heat transfer from the nozzle (35) through the cover tube (30) into the cooled inner tube (40) while maintaining electrical isolation therefrom.

5 Claims, 8 Drawing Figures

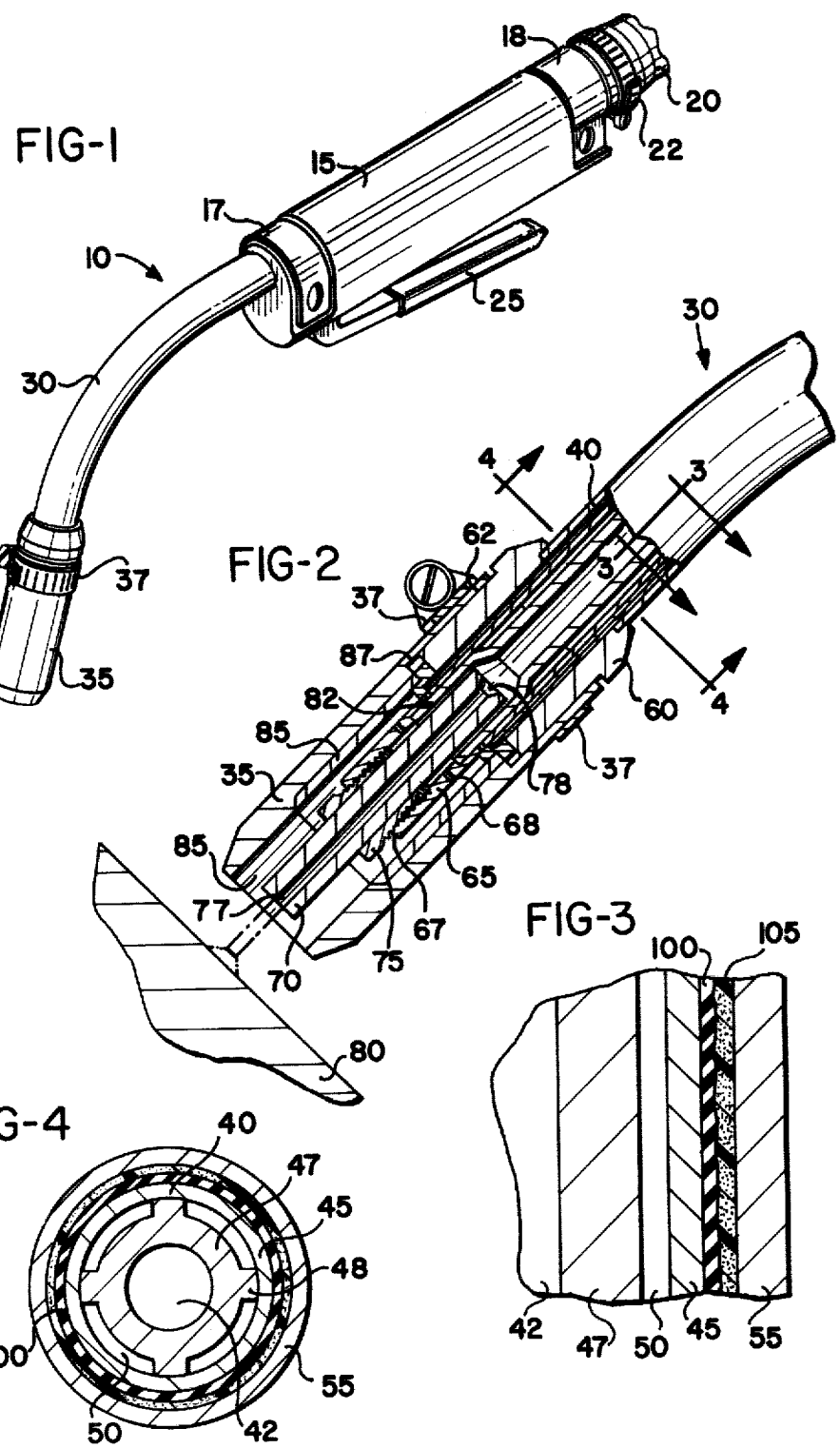

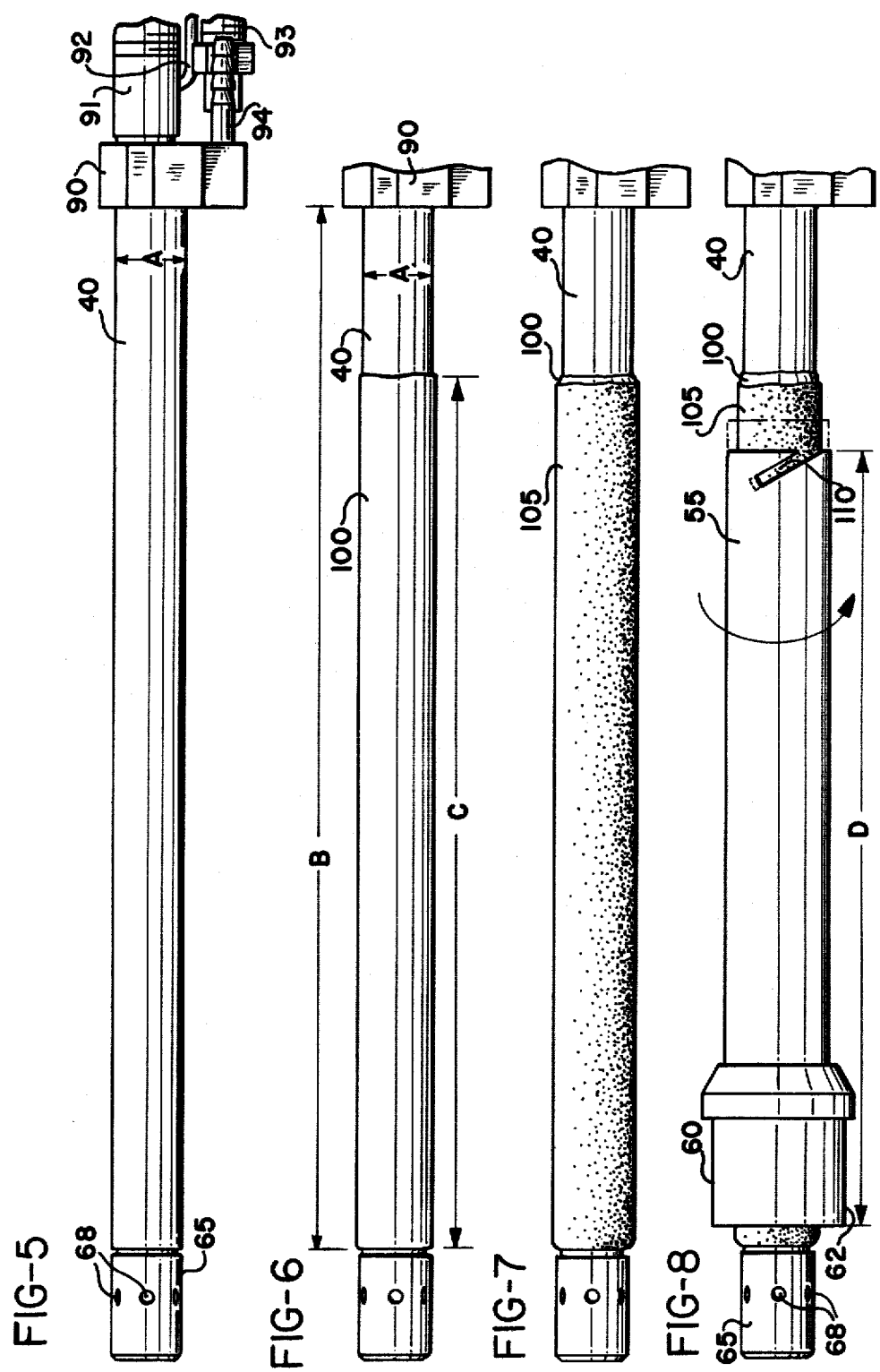

WATER COOLED WELDING GUN

BACKGROUND OF THE INVENTION

This invention relates to a water-cooled welding gun and particularly to a novel method for cooling the gas shielding nozzle.

This invention is particularly useful on those electric arc welding torches of the type wherein a consumable electrode is directed toward a workpiece through an inner or guide tube, and where the electric arc is protected by shielding gas directed toward the arc by a nozzle.

A typical torch includes an elongated inner tube having a central opening which carries the consumable electrode and shielding gas and a contact tip at the end. In high amperage environments, means are usually provided for cooling the contact tip, otherwise it will be damaged by overheating and melting. One common technique is to provide the tube with passageways surrounding the central opening through which cooling water is circulated. In addition to cooling the contact tip, the gas shielding nozzle should also be cooled, otherwise metal splattered from the weld will tend to adhere to it. It has been found that the hotter the nozzle, the more tenaciously the splatter will adhere to it.

The welding operator will frequently attempt to clean the nozzle, and by doing so will roughen its surface and as a consequence, the splatter will adhere even more tightly to it. Frequently, the welder will attempt to remove the splatter by striking the nozzle against a hard surface. Therefore, those nozzles that are not adequately cooled have a relatively short lifespan, not only because of the direct effects of over heating, but also because of physical abuse.

Prior art attempts to provide cooling for the nozzle have included the use of a thermally conductive but electrically insulative material, such as a ceramic sleeve placed between the nozzle and the water cooled tube, or by means of a material, such as aluminum oxide, which is first flame sprayed onto the outer surface water cooled tube, and then the nozzle secured thereto.

In those guns using a ceramic ring, the surface area between the nozzle and the water cooled member is limited, thus limiting the cooling efficiency of that arrangement. Flame sprayed $Al_2O_3$ is difficult to apply to a high dimensional tolerance, and this material is too hard to be ground to size efficiently.

SUMMARY OF THE INVENTION

This invention relates to an arc welding torch of the type which includes an elongated current carrying inner tube having a central opening through which a consumable electrode and shielding gas may pass, means for cooling the tube, such as by water circulating through channels formed therein, an elongated cover tube surrounding the inner tube and which is connected thereto by means providing a thermally conductive but electrically insulative connection, and a gas shielding nozzle secrued to the cover tube and positioned at the end of the torch.

Specifically, the outer surface of the inner tube is preferably flame sprayed with $Al_2O_3$. This is an essentially rigid layer of a thermally conducting but electrically insulating material. Since the dimensional tolerances of this material are difficult to maintain, a second coating of a thermally conducting but preferably electrically insulating material is applied over this surface of the ceramic material prior to the installation of the cover tube. Preferably, the second layer is an epoxy which is pliable when initially applied so that after the cover tube is installed, it will fill all of the gaps between the rigid coating and the inner surface of the cover tube.

In some applications, it is desired to bend the tube after assembly, but it has been found that such bending will crack the ceramic material. Because air is an excellent insulator, these cracks reduce the heat transfer efficiency. However, by adding a layer of epoxy, these cracks are filled, and therefore the space between the inner tube and the guide tube is filled with a heat conductive material.

Because the nozzle is in direct contact with the guide tube, and because the guide tube is elongated and in thermal relation with the water cooled inner tube substantially throughout its length, the thermal efficiency of this arrangement is high, the nozzle will remain cool, and therefore be less subject to the adverse effects of overheating and to physical damage by the welder in attempting to clean splatter off of the nozzle.

Also, a welding gun constructed according to this invention is relatively simple to manufacture since high tolerances in the dimensions of the ceramic coating in the inside diameter of the cover tube need not be maintained, the space therebetween being filled with an initially pliable material, such as a heat conductive epoxy.

Accordingly, it is an object of this invention to provide a method of assembling an arc welding torch of the type described wherein a cooled inner tube is first coated with a electrically conductive, electrically insulative ceramic material, thereafter applying over the ceramic an electrically conductive and preferably electrically insulative second material which is initially pliable and which has a thickness sufficient to fill the space between the outer surface of the ceramic material and the inner surface of a cover tube, placing the cover tube in position over the inner tube, and finally curing the second material thereby to form an assembled torch.

It is also an object of this invention to provide an improved arc welding torch which is highly efficient in the heat transfer characteristics between an electrically insulative gas shielding nozzle and that member within the torch which is being cooled by providing a thermal path over a relatively large surface area from the nozzle into a cover tube and from the cover tube through layers of thermally conductive but electrically insulative material to a cooled inner tube.

These and other objects of the invention will be apparent from the following description, the accompanying drawings and the appended claims.

BRIEF DESCRIPTION OF THE DRAWINGS

FIG. 1 is a perspective view of an arc welding torch constructed according to this invention;

FIG. 2 is a view, partly in cross-section, showing the nozzle end of the arc welding torch;

FIG. 3 is a cross-sectional view taken along line 3—3 in FIG. 2;

FIG. 4 is a cross-sectional view taken along line 4—4 in FIG. 2;

FIG. 5 is an elevational view showing the current carrying inner tube;

FIG. 6 is a view showing the current carrying inner tube with a coating of ceramic material placed thereon;

FIG. 7 is a view like FIG. 6 showing the application of a second coating of a pliable, heat conductive material, such as epoxy; and FIG. 8 is a view like FIG. 7 with the gun tube cover installed over the current carrying inner tube.

DESCRIPTION OF THE PREFERRED EMBODIMENT

Referring now to the drawings, which show a preferred embodiment of the invention and particularly to FIG. 1, an arc welding gun 10 is shown with the handle 15 connected to a cable 20 which carries the welding wire, control wires, a shielding gas supply tube, water hoses, and welding power cable. The handle 15 is secured to the gun 10 by clamps 17 and 18. The hose 20 is secured to the gun by means of clamp 22. A switch 25 in the handle controls the feeding of the welding wire and the application of welding current. The gun also includes a neck member 30 provided at its end with a shielding gas nozzle 35. The nozzle is held in place by means of a clamp 37.

The neck member 30 includes a current carrying inner tube 40 extending through the handle 15 to the nozzle 35. This tube is provided with a central opening 42 through which the welding wire and shielding gas passes from the cable 20 to the nozzle, and it is also provided with means for cooling the tube. As best shown in FIGS. 3 and 4, the inner tube 40 is actually comprised of two separate tubes, a shell 45 and a center tube 47 which is provided with a plurality of radially extending ribs 48. The spaces 50 formed between the center tube and the shell comprise water passageways through which cooling water is directed along the length of the tube from the handle to the nozzle. Two of these passageways carry water from the handle to the nozzle, and the other two are used for water return.

The neck member also includes a elongated gun tube cover 55 provided with an adapter 60 at its end. The adapter has an outer surface 62 to receive the gas shielding nozzle 35. The adapter has the same inside diameter as the gun tube cover and it is preferably secured to the cover by soldering.

Referring again to FIG. 2, the current carrying inner tube 40 has attached thereto an end member 65 having a central opening coaxial with the opening 42 in the inner tube and provided with an interior threaded surface 67 and a plurality of radially extending gas openings 68. A replaceable contact tip 70 is received into the end member and secured in place by a retaining nut 75. The contact tip has formed therein a central opening 77 through which the welding wire passes. A beveled surface 78 at the end toward the welding gun assists in directing the wire into and through the opening.

Thus, a welding wire may be fed through the cable 20 and the handle 15 into the central opening 42 of the neck where it passes into the contact tip and then toward a workpiece 80. Contact tip 70 is in electrical contact with the inner tube 40, and the inner tube is connected directly to the welding power cable in the cable assembly 20. Shielding gas, also supplied through the cable 20, is carried by the inner opening 42 to passageways 82 and through the radial openings 78 into the chamber 85 formed by the gas shielding nozzle 35. This shielding gas is directed toward the workpiece 80 and protects the arc against contamination by the atmosphere.

An insulating sleeve 85 is positioned in a recess formed in the nozzle 35 in the area surrounding the end member 65 and the retaining nut 75. This sleeve is preferably formed of electrical grade G7 tubing. Also, an insulating ring 87 of fiber is positioned between the end of the tube 40 and adapter 60 and the nozzle 35 end member 65. The sleeve 85 and ring 87 prevents metal splattered from the arc into the nozzle from causing an electrical connection to be made between the nozzle and the inner tube 40 and thus insures that the nozzle will not become electrically hot and cause an arc when brought into contact with the workpiece.

The current carrying inner tube 40 is shown in FIG. 5 with the end member 65 at the left, and a junction block 90 at the right. The junction block is provided with a fitting 91 located coaxial with the inner tube 40. Welding wire is introduced directly into the fitting 91, and shielding gas is introduced into the tube through the fitting 91 by means of a tube 92. Cooling water is introduced into and removed from the passageways 50 by means of hoses connected to the fittings 93 and 94.

The outside diameter A of the tube 40, as shown in FIG. 6, is approximately 0.565 inches, and its length B is approximately 8.25 inches. A coating of aluminum oxide, ($Al_2O_3$), approximately 0.010 inch in thickness, is applied to the tube throughout the length C which is approximately 6.75 inches. This brings the outside diameter to the tube to 0.587 inches, nominal.

The aluminum oxide is generally flame sprayed onto the tube 40 and has a thermal conductivity of 20 btu/hr/sq.ft./°F./inch. This is far superior to the thermal conductivity of Teflon which is 0.14. The aluminum oxide has an electrically insulating capacity of approximately 200 volts per mil thickness, thus giving a possible voltage protection of 2,000 volts in the present embodiment, which is far more than adequate.

Referring briefly to FIG. 3, it may be seen that the exterior surface of the aluminum oxide coating 100 is not entirely smooth. It has a rough texture, and it is difficult to maintain accurate dimensional tolerances with this material.

Referring now to FIG. 7, an additional coating of a pliable, thermally conducting, preferably electrically insulating material, such as an epoxy manufactured by Emerson and Cuming under the trademark EC-COCOAT 582 is applied over the aluminum oxide. This second coating is initially pliable when applied but is hard when cured.

The gun tube cover 55, which has attached thereto the adapter 60, is next installed over the prepared tube of FIG. 7. The length of the tube D is approximately 7.19 inches to provide an elongated thermal path for heat to flow from the adapter into the tube cover, and from the tube cover 55 through the thermally conductive materials 105 and 100 into the water cooled tube 40. The outside diameter of the second material 105 is therefore slightly larger than the interior diameter of the tube cover 55 prior to the installation. The tube cover is preferably installed by rotating it in a clockwise direction, as shown by the arrow in FIG. 8. As the cover is pushed onto the tube 40 from the left, as shown in FIG. 8, a slot 110 at the forward end (when it is being installed) is provided to assist in drawing into the gun tube cover 55 that epoxy material 105 which may be forced away from the cover as it is advanced.

The epoxy material 105 may be cured by allowing it to stand overnight at room temperature, or alternatively by allowing it to remain one half hour at room temperature followed by one hour of heating at 150° F. (65° C.). Because the second material 105 is pliable initially, it will fill the gaps between the inside diameter of the cover tube (0.625 inch) and the exterior surface of the ceramic material 100.

After the neck member has been assembled, as shown in FIGS. 5-8, but before the epoxy material 105 is cured, it may be formed or bent to that configuration shown in FIG. 1. Because the ceramic material 100 is rigid, some cracks may be formed therein due to the bending action; however, the epoxy material will tend to fill these cracks since it is still in the pliable state.

The total thickness of both the ceramic and the epoxy materials is approximately 0.030 inch. Due to the high thermal conductivity of both materials, however, and the long length of thermal contact between the gun tube cover 55 and the water cooled inner tube 40, the gas shielding nozzle 35 is provided with adequate cooling, keeping its temperature low, thereby protecting it from overheating and reducing the tendency for splattered metal to adhere thereto.

For manufacturing convenience, the ceramic material has a nominal thickness of 0.010 inch. The total radial clearance between the outside diameter of the inner tube 40 and the inside diameter of the cover tube is 0.030 inch, thus providing a 0.020 inch clearance between the ceramic coated tube of FIG. 6 and the cover tube, which clearance is easy to maintain in a practical manufacturing environment. Of course, if one could hold tighter tolerances, less clearance would be required and the total thickness of the thermally conductive but electrically insulation materials could be reduced.

While the form of apparatus herein described constitutes a preferred embodiment of this invention, it is to be understood that the invention is not limited thereto, and that changes may be made therein without departing from the scope of the invention.

What is claimed is:

1. Method of assembling an arc welding torch of the type including a water-cooled inner tube having a central opening for wire and shielding gas to pass therethrough, and a cover tube mounted coaxially over said inner tube and having an adapter at one end for receiving replaceable gas shielding nozzles, the method comprising the steps of:
   coating the outer surface of the inner tube with a thermally conductive, electrically insulating ceramic material,
   thereafter applying a thermally conductive, electrically insulating epoxy to said coated surface, said epoxy having a thickness sufficient to fill the space between the outer surface of the ceramic material and the inner surface of the cover tube,
   placing said cover tube over said inner tube while the epoxy is in a pliable state, and
   curing said epoxy to form an assembled torch,
   whereby the epoxy fills the gaps between the inner surface of the cover tube and the coating thereby to provide a thermally conductive path from said nozzle through said cover tube to said water cooled inner tube while maintaining the nozzle electrically isolated therefrom.

2. In an arc welding torch including a current carrying elongated inner tube having a central opening through which a consumable electrode and shielding gas may pass, means for cooling said inner tube, a gas shielding nozzle, an elongated cover tube in thermal relation with said nozzle and surrounding said inner tube, and means for providing a thermally conductive but electrically insulative connection between said nozzle and said inner tube,
   the improvement comprising:
   a rigid layer of thermally conducting but electrically insulating material on the outer surface of said inner tube extending substantially the length of said cover tube, and
   a coating of a thermally conducting but electrically insulating material which is pliable when initially placed between the inner surface of the cover tube and said rigid layer for filling the gaps therebetween, said coating becoming rigid thereafter thereby to provide an elongated thermal path whereby heat may be transferred from said nozzle and said cover tube to said inner tube while maintaining the nozzle electrically isolated therefrom.

3. In an arc welding torch including a water-cooled, current carrying elongated inner tube having a central opening through which a consumable electrode and shielding gas may pass, a gas shielding nozzle, an elongated cover tube in thermal relation with said nozzle and surrounding said inner tube, and means for providing a thermally conductive but electrically insulative connection between said nozzle and said inner tube,
   the improvement comprising:
   a rigid coating of thermally conductive but electrically insulating material on the outer surface of said inner tube, and
   a thermally conductive but electrically insulating coating of epoxy between the inner surface of the cover tube and said rigid coating for filling the gaps therebetween thereby to provide an elongated thermal path whereby heat may be transferred from said nozzle and said cover tube to said water-cooled inner tube while maintaining the nozzle electrically isolated therefrom.

4. The torch of claim 3 wherein said rigid coating of thermally conductive but electrically insulating material is aluminum oxide.

5. The torch of claim 3 wherein said rigid coating is flame-sprayed aluminum oxide having a thickness of 0.010 inch.

* * * * *